May 17, 1955  F. C. HUEBNER ET AL  2,708,465
GUIDE CLAMPABLE UPON WORK FOR POWERED HAND SAWS
Filed June 9, 1952  2 Sheets-Sheet 1
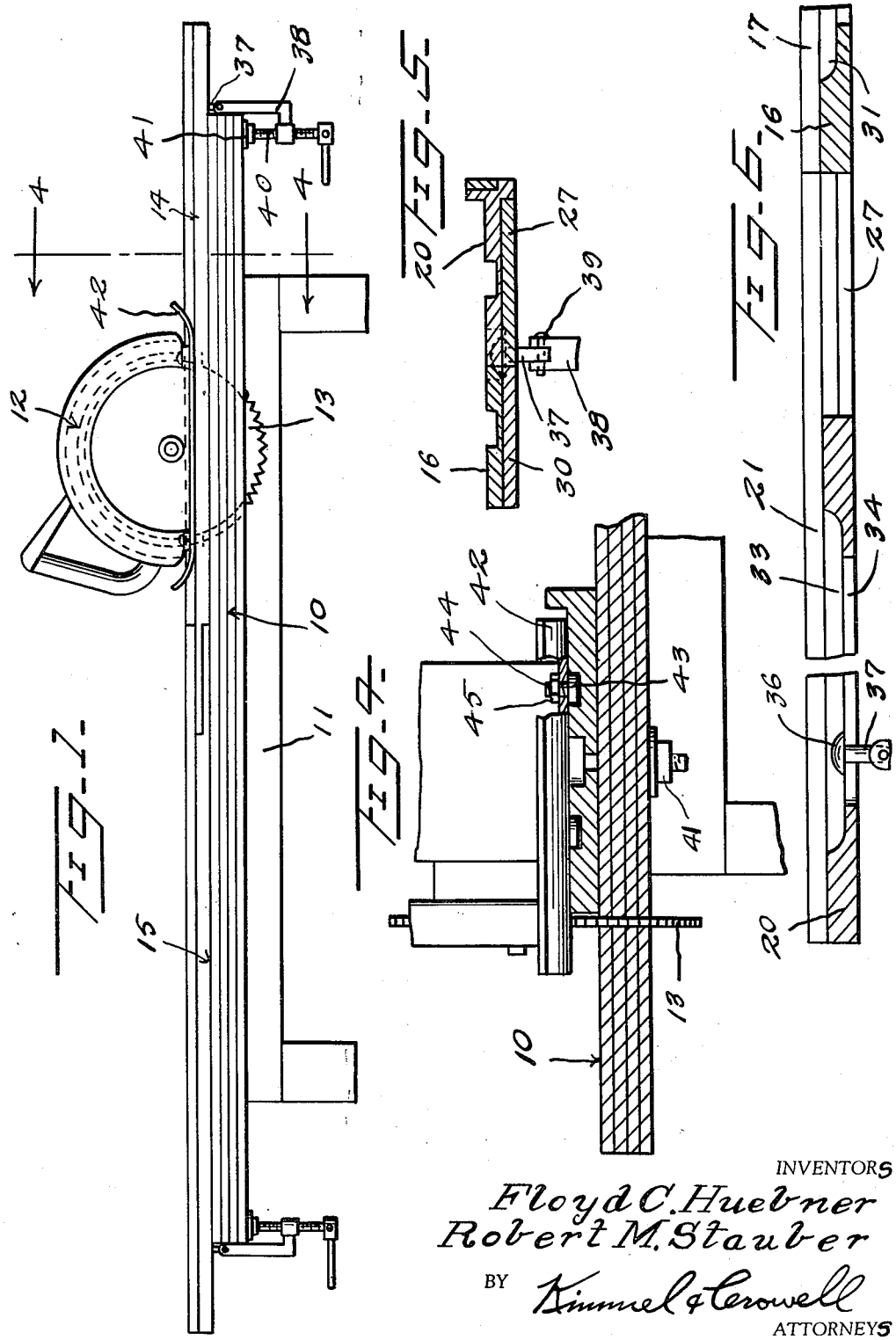
INVENTORS
Floyd C. Huebner
Robert M. Stauber
BY Kimmel & Crowell
ATTORNEYS

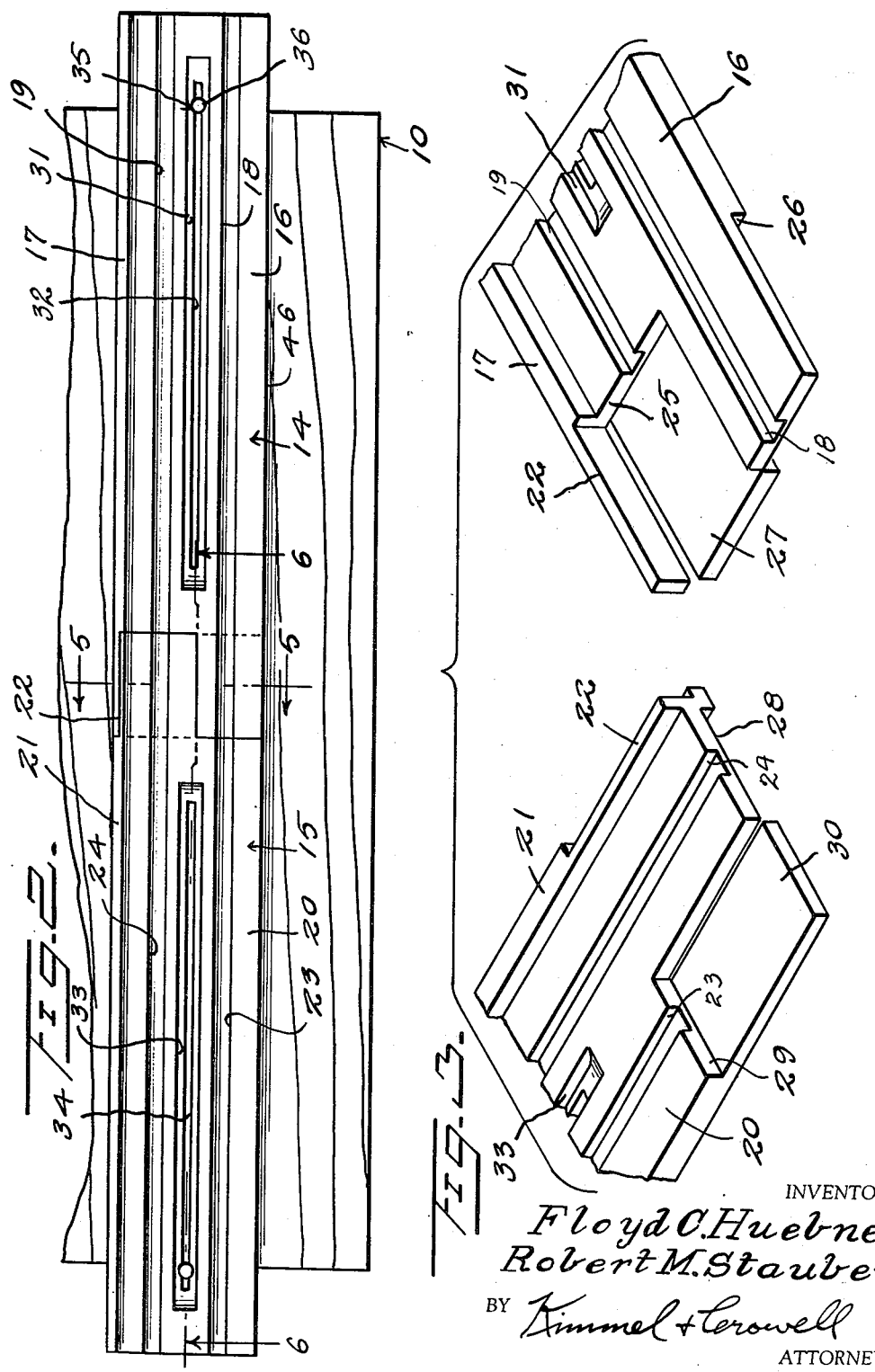

United States Patent Office 2,708,465
Patented May 17, 1955

2,708,465

GUIDE CLAMPABLE UPON WORK FOR POWERED HAND SAWS

Floyd C. Huebner and Robert M. Stauber, Stromsburg, Nebr.

Application June 9, 1952, Serial No. 292,438

2 Claims. (Cl. 143—47)

This invention relates to a guide for powered hand saws.

An object of this invention is to provide a guide for a hand saw of the power type which can be readily clamped onto a piece of plywood for guiding the saw in a straight line so that a straight cut can be made at any point irrespective of the contour of the edges of the plywood.

Another object of this invention is to provide a saw guide which is formed of interlocking sections which may be used either separately or together, depending upon the size of the board.

A further object of this invention is to provide a saw guide embodying a straight edge and cooperating means carried by the guide and the base of the saw for guiding the saw so that a straight cut can be made.

A further object of this invention is to provide a saw guide which is simple in construction and can be easily and quickly applied and removed.

With the above and other objects in view, our invention consists in the arrangement, combination and details of construction disclosed in the drawings and specification, and then more particularly pointed out in the appended claims.

In the drawings:

Figure 1 is a detailed side elevation of a saw guide constructed according to an embodiment of this invention combined with a powered hand saw.

Figure 2 is a plan view of the guide members.

Figure 3 is a fragmentary exploded perspective view of the guide members.

Figure 4 (Sheet 1) is a sectional view taken on the line 4—4 of Figure 1.

Figure 5 is a sectional view taken on the line 5—5 of Figure 2.

Figure 6 is a fragmentary sectional view taken on the line 6—6 of Figure 2.

Referring to the drawings, the numeral 10 designates generally a panel or plywood board which, in the present instance, is mounted on a table or bench 11. A powered hand saw generally designated as 12 having a circular saw blade 13 is adapted to cut a portion of the panel 10 as the saw is moved transversely or lengthwise of the panel 10.

In order to provide a means whereby the saw 12 will be guided in a straight line as it is moved across the panel 10, we have provided a pair of elongated saw guiding plates 14 and 15 which are adapted, as will be hereinafter described, to be interlocked at their inner ends and are also adapted to be clamped to the upper side of the panel 10.

The guide member 14 is formed of an elongated flat plate 16 which is provided with an upstanding reinforcing flange 17 along the inner edge thereof. The upper side of the plate 16 is provided with a pair of parallel channels 18 and 19, the purpose for which will be hereinafter described.

The guide member 15 is constructed similar to the guide member 14 and comprises an elongated flat plate 20 having an upstanding flange or rib 21 which is disposed in overlapping relation with respect to the flange or rib 17 by means of a lap joint, indicated at 22. The plate 20 is also formed with a pair of longitudinally extending parallel channels 23 and 24 which are adapted to communicate at their inner ends with the channels 18 and 19, respectively.

The inner end of plate 16 is formed with a cutout, indicated at 25, extending downwardly from the upper side thereof and is also formed with an oppositely disposed cutout 26 extending upwardly from the lower side thereof. The cutout 25 forms an elongated flat locking tongue 27 which is adapted to engage in a cutout 28 formed in the lower side of plate 20.

Plate 20 is also formed with a cutout 29 extending downwardly from the upper side thereof which produces a locking tongue 30 engageable in the cutout 26. The plate 16 is also formed between the channels 18 and 19 with a channel 31 and a slot 32 extending through the plate 16 within the channel 31.

Plate 20 is also formed with an elongated channel 33, which is positioned between the channels 23 and 24 and a slot 34 is cut through the plate 20 within the channel 33. A headed bolt 35 (Fig. 2) is adapted to have the head 36 thereof disposed in channel 31, with the shank 37 extending loosely through the slot 32. An L-shaped clamping member 38 (Fig. 1) is pivotally secured to the shank 37, as indicated in Figure 5, by means of a pin 39. A screw shaft 40 is threaded through the horizontal side of L-shaped member 38 and a swiveled clamping head 41 is carried by the upper end of the screw shaft 40. Plate 20 has a similar clamping structure disposed in the channel 33, and the slot 34 thereof, and these clamping members are adapted to extend downwardly over the outer edges of the panel or board 10 with the clamping head 41 bearing against the lower side of the panel 10.

The clamping members may then be tightened so that the guide members 14 and 15 will be tightly clamped to the upper side of the panel 10 at a point inwardly from one edge of the latter. The hand saw 12 includes a base plate 42 which is slidable on the upper sides of the guide members 14 and 15. The base member 42, as shown in Figure 4, has secured thereto pairs of pins or dowels 43 which slidably engage in the channels of the guide members.

As shown in Figure 4, the pins or dowels 43 are removable from the base 42 and are formed with a threaded stud 44 secured relative to the base 42 by means of a nut 45. By making the pins or dowels 43 removable from the base 42, the hand saw can be used for cutting wood without the guide members 14 and 15. When the saw member 12 is in cutting position relative to the panel 10 and the guide members 14 and 15, the saw blade 13 will be disposed closely adjacent the outer straight edge 46 of the guide members 14 and 15. The blade 13 will cut through the panel 10 along the straight edge 46 so that the panel 10 may be cut in a straight line at any point inwardly from an edge thereof, irrespective of the configuration of any one or more edges of the panel.

The interlocking inner ends of the guide members 14 and 15 provide a means whereby two or more of these guide members may be locked together to form a relatively long straight edge. Where the panel is relatively narrow and will be confined within the length of one of the guide members and the slot, such as slot 32, the two clamps hereinbefore described may be mounted in one of the guide members and this guide member clamped to the narrow or short panel.

We do not mean to confine ourselves to the exact details of construction herein disclosed, but claim all variations falling within the purview of the appended claims.

What is claimed is:

1. In combination, a rotary hand saw having a circular saw and a base provided with depending guide pins, a pair of elongated substantially rectangular guide members disposed in end-to-end relationship with the inner adjacent ends thereof provided with interlocking means, one of said members having a pair of recesses formed therein extending inwardly from its said inner end and opening, respectively, into opposite sides thereof, said one member having a third recess extending inwardly from said inner end and opening into an edge thereof, the inner end of the other of said members having a pair of tongues projecting therefrom in staggered relation relative to the opposite sides thereof, said pair of tongues engaging within said pair of recesses, said second member having a third tongue projecting from said inner end thereof, said third tongue being positioned at a side of said second member for engagement within said third recess, and each of said members having a pair of channels formed therein, each of said pair of channels of one member being aligned with said pair of channels on the other of said members, said channels being adapted to receive slidably said guide pins.

2. In combination, a rotary hand saw having a circular saw and a base slidably mounted on the work, a pair of elongated substantially rectangular guide members disposed in end-to-end relationship and provided with interlocking means on their respective adjacent inner ends, one of said inner ends of one of said members having a substantially rectangular recess extending inwardly from said inner end, said recess opening into a side and edge of said member, said one member having a second substantially rectangular recess formed therein and extending inwardly from said inner end, said second recess being adjacent to said first recess and opening into the other side of said member, said one member having a longitudinal flange extending along the other side thereof and provided with a substantially rectangular recess extending inwardly from said inner end of said member, said last named recess opening into a side and edge of said flange, said inner end of said second member having a substantially rectangular tongue projecting therefrom for insertion in said first recess in said one member, said inner end of said second member having a second tongue projecting therefrom adjacent said first tongue, said second tongue engaging in said second recess in said first member, said second member having a longitudinal flange extending along a side thereof and having a tongue extending therefrom engaging within said third recess formed in said one member, said members upon interlocking of said inner ends constituting an elongated compound unit having a substantially rectangular configuration with said flanges longitudinally aligned, each of said members having a pair of guide channels aligned with a pair of guide channels on the other of said members, and guide pins carried by said base for engagement within said channels, and clamping means at each end of said unit for clamping said unit to said work.

References Cited in the file of this patent

UNITED STATES PATENTS

| 316,752 | De Blanc | Apr. 28, 1885 |
| 1,411,864 | Mitrovich | Apr. 4, 1922 |
| 1,911,045 | Tinnen | May 23, 1933 |
| 2,396,961 | Meredith | Mar. 19, 1946 |

FOREIGN PATENTS

| 778,528 | France | Dec. 22, 1934 |